United States Patent
Kwon et al.

(10) Patent No.: US 8,470,920 B2
(45) Date of Patent: Jun. 25, 2013

(54) POLYOLEFIN COMPOSITION FOR AN INTERIOR SHEET/FILM

(75) Inventors: Sang Min Kwon, Seoul (KR); Seok Jin Kim, Seoul (KR); Tae Keun Lee, Daejeon (KR); Woon Ki Chung, Seoul (KR)

(73) Assignee: SK Innovations, Co., Ltd., Seoul (KR)

( * ) Notice: Subject to any disclaimer, the term of this patent is extended or adjusted under 35 U.S.C. 154(b) by 0 days.

(21) Appl. No.: 13/514,667

(22) PCT Filed: Feb. 12, 2010

(86) PCT No.: PCT/KR2010/008565
§ 371 (c)(1),
(2), (4) Date: Jun. 8, 2012

(87) PCT Pub. No.: WO2011/071270
PCT Pub. Date: Jun. 16, 2011

(65) Prior Publication Data
US 2013/0005893 A1    Jan. 3, 2013

(30) Foreign Application Priority Data
Dec. 9, 2009    (KR) .................. 10-2009-0121683

(51) Int. Cl.
*C08K 3/26* (2006.01)
(52) U.S. Cl.
USPC ............ 524/427; 524/449; 524/450; 524/451
(58) Field of Classification Search
USPC ......................................... 524/427, 449–451
See application file for complete search history.

(56) References Cited

U.S. PATENT DOCUMENTS
3,607,611 A * 9/1971 Matsui et al. ................. 428/374
7,323,251 B2    1/2008 Saitou

FOREIGN PATENT DOCUMENTS
| JP | 11-343372 | 12/1999 |
| JP | 2006-0137910 | 6/2006 |
| KR | 1020010032519 A | 4/2001 |
| KR | 100873298 | 12/2008 |

OTHER PUBLICATIONS
Marcincin et al., "Fibre-Forming Blends of Polypropylene and Polyethylene Terephthalate," *Macromol. Symp.*, vol. 176, pp. 65-72 (2001).

* cited by examiner

*Primary Examiner* — Peter Szekely
(74) *Attorney, Agent, or Firm* — Abelman, Frayne & Schwab

(57) ABSTRACT

The present invention relates to a polyolefin composition for an interior sheet/film. The polyolefin composition of the present invention for an interior sheet comprises 70 to 99 wt % of polyolefin and 1 to 30 wt % of modified polyethylene terephthalate having a melting point of 130 to 180° C. The polyolefin composition of the present invention is environmentally friendly and has good physical properties such as workability, printing characteristics, and adhesiveness. In addition, sheets having various thicknesses can be produced by extrusion without having to stretch the sheets, and thus the sheets can be used separately or in combination in various application fields.

7 Claims, No Drawings

POLYOLEFIN COMPOSITION FOR AN INTERIOR SHEET/FILM

TECHNICAL FIELD

The present invention relates to a polyolefin composition for an interior sheet/film.

BACKGROUND ART

Environmentally friendly building materials and interior/exterior finishing materials are receiving attention these days because of the environmental problems they cause. Such finishing materials include interior sheets/films, including decoration sheets (hereinafter, referred to as "deco sheets"), wallpaper, flooring materials, or adhesive films which are to be attached for advertising and external appearance purposes. In particular, deco sheets are sheets suitable for being used to represent a decorative pattern such as a wood pattern on furniture, such as wardrobes, sink tables, storage closets, etc., and are typically utilized to express a wood pattern or other patterns on a wood plate resulting from renaissance trees because raw lumber is very expensive.

Unless otherwise stated, the meaning of the term "interior sheet/film" used in the present invention may include all of deco sheets, wallpaper, flooring materials, or adhesive films.

Such interior sheets/films have been produced to date from a PVC material using a calendering process which is able to produce a sheet which is thin and wide. However, the material used contains environmental hormones and may generate dioxin upon combustion, and is undesirably harmful to the health, responsible for sick house syndrome, for example. Hence, there is an increasing need for environmentally friendly materials.

Examples of such environmentally friendly materials include polyolefn resins such as polypropylene, polyethylene or mixtures thereof. However, polyolefin resins which are non-polar have poor printability and adhesiveness compared to those of conventional PVC and are difficult to print on or adhere using a conventional machine for applying PVC ink or adhesive. Furthermore, although corona treatment may be performed to impart printability, this may increase the number of processing steps and make it impossible to perform printing after the passage of a predetermined period of time.

In order to increase printability, expensive non-polar ink is used, undesirably increasing the cost of products, and furthermore this may remarkably deteriorate printability compared to conventional PVC in interior sheets/films which require precise printing. Also in order to enhance adhesive force, primer pretreatment may be conducted before an adhesive is applied, undesirably increasing the number of processing steps and raising the cost of products.

Patent literature 1 and patent literature 2 disclose a polyolefin resin including polyethylene terephthalate (PET), etc. However, these patents do not pertain to interior sheets/films, and are useful in producing vessels such as bottles, trays, etc. and secondary processing products on which it is easy to perform vacuum molding.

Accordingly, the demand for a commercially available polyolefin resin having superior printability and adhesiveness is increasing.

Patent literature 1: Japanese Unexamined Patent Application Publication No. 2006-137910

Patent literature 2: Japanese Patent No. 3856948

DISCLOSURE

Technical Problem

Culminating in the present invention, extensive and thorough research into polyolefin compositions having superior printability and adhesiveness while producing interior sheets/films using polyolefin resins via extrusion or calendering, carried out by the present inventors aiming to solve the problems encountered in the related art, resulted in the finding that when modified PET is added to the polyolefin composition, the above problems may be solved.

Accordingly, an object of the present invention is to provide an environmentally friendly polyolefin composition, which does not cause environmental pollution due to dioxin or heavy metals which are environmentally hazardous materials and which generates small amounts of organic volatile components and carbon dioxide, thus mitigating sick house syndrome.

Another object of the present invention is to provide a polyolefin composition for an interior sheet/film, which may exhibit properties including printability and adhesiveness equivalent to those of conventional PVC deco sheets, and may have superior workability and thus may produce thin sheets so that such sheets may be used separately or in combination and be applied to a variety of fields.

Technical Solution

In order to accomplish the above and the other objects, the present invention provides a polyolefin composition for an interior sheet/film, including 70~99 wt % of polyolefin and 1~30 wt % of modified polyethylene terephthalate having a melting point of 130~180° C.

Also, the polyolefin may be polypropylene or polypropylene containing 2~30 wt % of an elastic ethylene-propylene copolymer.

Also, the polyolefin may be a mixture composed of 50~99 wt % of polypropylene or polypropylene containing 2~30 wt % of an elastic ethylene-propylene copolymer, and 1~50 wt % of at least one polyethylene selected from the group consisting of low-density polyethylene, linear low-density polyethylene and high-density polyethylene.

In the polyolefin composition for an interior sheet/film of the present invention, the modified polyethylene terephthalate may be polyethylene succinic terephthalate or polyethylene adipic terephthalate.

Also, the polyolefin composition may further include 0.1~40 wt % of at least one inorganic material selected from the group consisting of calcium carbonate, talc, mica and zeolite.

Also, the polyolefin composition may further include 0.1~30 wt % of at least one rubber component selected from the group consisting of ethylenevinyl acetate (EVA), ethylene/propylene/non-conjugated diene terpolymer (EPDM), styrene-butadiene rubber (SBR), and acrylonitrile-butadiene synthetic rubber (NBR).

Also, the polyolefin composition may further include 0.001~3 wt % of at least one compatibilizer selected from the group consisting of methylmethacrylate-butadiene-styrene (MBS), EVA, maleic anhydride, and polypropylene-graft-maleic anhydride (PP-g-MA).

Advantageous Effects

According to the present invention, a polyolefin composition does not cause environmental pollution due to dioxin or heavy metals which are environmental hazardous materials and the polyolefin composition can generate small amounts of organic volatile components and carbon dioxide, and thus is environmentally friendly and stable and can mitigate sick house syndrome. As well, this composition can exhibit properties including printability and adhesiveness equivalent to those of conventional PVC deco sheets. Furthermore, because of superior workability, sheets/films can be produced in various thicknesses without stretching, so that the sheets/films can be used separately or in combination and be applied to a variety of fields.

BEST MODE

The following is a detailed description of the present invention.

As mentioned above, a polyolefin composition for an interior sheet/film according to the present invention includes 70~99 wt % of polyolefin and 1~30 wt % of modified polyethylene terephthalate having a melting point of 130~180° C.

In the present invention, the polyolefin may be composed of propylene alone (100 wt %), namely, homopolypropylene, to obtain products having superior heat resistance and stiffness, or polypropylene containing 2~30 wt % of an elastic ethylene-propylene copolymer may be used to exhibit superior impact strength and hiding power. If the amount of the elastic ethylene-propylene copolymer is less than 2 wt %, desired impact strength and hiding power cannot be obtained. In contrast, if the amount thereof exceeds 30 wt %, workability and stiffness may become poor and desired products cannot be obtained.

Also, the polyolefin composition according to the present invention contains 50~99 wt % of polypropylene to obtain superior workability, heat resistance and stiffness, and also to impart flexibility to the products, at least one polyethylene selected from the group consisting of low-density polyethylene, linear low-density polyethylene and high-density polyethylene may be added in an amount of 1~50 wt % thereto. If the amount of the polyethylene exceeds 50 wt %, it is difficult to mold products, and heat resistance and stiffness may become poor, thus making it impossible to obtain the desired products. In this case, it is useful to use propylene alone (100 wt %), or polypropylene containing 2~30 wt % of an elastic ethylene-propylene copolymer, as the polypropylene.

Typically, polyolefin which is non-polar has very low printability and adhesiveness. As such, polarity may be temporarily imparted using corona treatment and printing may be carried out using non-polar ink, but these may be problematic because an additional process has to be performed and printing does not occur after the passage of a predetermined period of time after corona treatment. Hence, when polyethylene terephthalate (PET) having polarity is grafted to polyolefin, a sheet having superior printability and adhesiveness may be obtained. Because the melting point of typical PET is considerably different from that of polyolefin, such PET has low compatibility and poor workability and printability and thus cannot be used. Accordingly, modified PET having a melting point of 130~180° C. may be used. In particular, an example of PET having high compatibility with polyolefin to thus obtain desired properties includes polyethylene succinic terephthalate or polyethylene adipic terephthalate.

In the present invention, the amount of PET is set in the range of 1~30 wt %. If the amount thereof is less than 1 wt %, there is no difference from products which do not contain this component. In contrast, if the amount thereof exceeds 30 wt %, compatibility may decrease making it difficult to perform processing.

Upon mixing polyolefin with the modified PET, the melting point of the modified PET is controlled to be similar to that of polyolefin, so that compatibility may become very good. In order to obtain superior compatibility, when polyolefin and modified PET are compounded using an extruder, at least one compatibilizer selected from the group consisting of EVA, MBS, maleic anhydride and PP-g-MA is added in an amount of 0.001~3 wt %, whereby compatibility may be further increased, thus improving properties including workability and printability. If the amount thereof is less than 0.001 wt %, there are no additional effects. In contrast, if the amount thereof exceeds 3 wt %, properties of the resin may deteriorate undesirably making it difficult to perform processing and decreasing the properties of sheets/films.

The polyolefin compound according to the present invention may further include either an inorganic material or rubber.

The polyolefin composition according to the present invention may further include 0.1~40 wt % of at least one inorganic material selected from the group consisting of calcium carbonate, talc, mica and zeolite to increase the cooling rate, stiffness and hiding power. If the amount of the inorganic material exceeds 40 wt %, workability may decrease and flexibility may become poor, undesirably causing adhesive problems and decreasing impact strength, making it impossible to use the resulting products.

Also, the polyolefin composition according to the present invention may further include 0.1~30 wt % of at least one rubber component selected from the group consisting of EVA, EPDM, SBR and NBR to maintain workability and heat resistance and to obtain the desired flexibility. As such, if the amount of rubber exceeds 30 wt %, workability may decrease and stiffness may become poor, making it impossible to use the resulting products.

The polyolefin composition according to the present invention having the above components is compounded while being melted using an extruder, made in the form of a sheet using a die, and extruded between a pair of rollers of the extruder, thus obtaining a sheet having the desired thickness. The interior sheet/film thus formed may have superior printability and adhesiveness and may thus be utilized for deco sheets, wallpaper, flooring materials, adhesive films, etc.

The following examples are set to forth to more fully understand the present invention but are not to be construed as limiting the scope of the present invention.

Example 1

A mixture composed of 80 wt % of polypropylene and 20 wt % of polyethylene succinic terephthalate having a melting point of about 160° C. was compounded using a twin screw extruder at about 230° C., discharged in the form of a sheet using a die, and then passed between a pair of rollers of the extruder, thus producing an interior sheet having a thickness of about 0.1 mm and a width of 1500 mm.

Example 2

A mixture composed of 80 wt % of polypropylene containing about 15 wt % of an ethylene-propylene copolymer, and 20 wt % of polyethylene succinic terephthalate having a melting point of about 160° C. was compounded using a twin screw extruder at about 230° C., discharged in the form of a sheet using a die, and then passed between a pair of rollers of the extruder, thus producing an interior sheet having a thickness of about 0.2 mm and a width of 1500

Example 3

A mixture composed of 60 wt % of polypropylene, 20 wt % of low-density polyethylene, and 20 wt % of polyethylene succinic terephthalate having a melting point of about 150° C. was compounded using a twin screw extruder at about 230° C., discharged in the form of a sheet using a die, and then passed between a pair of rollers of the extruder, thus producing an interior sheet having a thickness of about 0.2 mm and a width of 1500 mm.

Example 4

A mixture composed of 60 wt % of polypropylene containing about 15 wt % of an ethylene-propylene copolymer, 20 wt % of low-density polyethylene, and 20 wt % of polyethylene succinic terephthalate having a melting point of about 150° C. was compounded using a twin screw extruder at about 230° C., discharged in the form of a sheet using a die, and then passed between a pair of rollers of the extruder, thus producing an interior sheet having a thickness of about 0.2 mm and a width of 1500 mm.

Example 5

A mixture composed of 60 wt % of polypropylene, 10 wt % of low-density polyethylene, 15 wt % of polyethylene succinic terephthalate having a melting point of about 160° C., 10 wt % of calcium carbonate and 5 wt % of EVA was compounded using a twin screw extruder at about 230° C., discharged in the form of a sheet using a die, and then passed between a pair of rollers of the extruder, thus producing an interior sheet having a thickness of about 0.2 mm and a width of 1500 mm.

Comparative Example 1

100 wt % of homopolypropylene having a melt flow index of 2.0 was compounded using a twin screw extruder at about 230° C., discharged in the form of a sheet using a die, and then passed between a pair of rollers of the extruder, thus producing an interior sheet having a thickness of about 0.2 mm and a width of 1500 nm.

Test samples of these sheets were made, and tensile strength (kg/mm$^2$), elongation (%), tear strength (kg/mm), printability and adhesiveness thereof were measured. The results are shown in Table 1.

Tear strength (kg/mm): measurement according to ASTM D1922

Printability: measurement of printing strength after 1 hr following gravure printing using typical PVC ink Adhesiveness: measurement of the adhesive strength by applying a typical PVC adhesive on a sheet and then attaching the sheet to plywood As is apparent from Table 1, the interior sheets/films according to the present invention can exhibit superior printability and adhesiveness without detracting from the other mechanical properties, compared to the sheet resulting from polypropylene alone (Comparative Example 1).

The invention claimed is:

1. A polyolefin composition for an interior sheet/film, comprising 70~99 wt % of polyolefin and 1~30 wt % of modified polyethylene terephthalate having a melting point of 130~180° C.

2. The polyolefin composition of claim 1, wherein the polyolefin is polypropylene or polypropylene containing 2~30 wt % of an elastic ethylene-propylene copolymer.

3. The polyolefin composition of claim 1, wherein the polyolefin is a mixture comprising 50~99 wt % of polypropylene or polypropylene containing 2~30 wt % of an elastic ethylene-propylene copolymer, and 1~50 wt % of at least one polyethylene selected from the group consisting of low-density polyethylene, linear low-density polyethylene and high-density polyethylene.

4. The polyolefin composition of claim 1, wherein the modified polyethylene terephthalate is polyethylene succinic terephthalate or polyethylene adipic terephthalate.

5. The polyolefin composition of claim 1, further comprising 0.1~40 wt % of at least one inorganic material selected from the group consisting of calcium carbonate, talc, mica and zeolite.

6. The polyolefin composition of claim 1, further comprising 1~30 wt % of at least one rubber component selected from the group consisting of ethylenevinyl acetate (EVA), ethylene/propylene/non-conjugated diene terpolymer (EPDM), styrene-butadiene rubber (SBR), and acrylonitrile-butadiene synthetic rubber (NBR).

7. The polyolefin composition of claim 1, further comprising 0.001~3 wt % of at least one compatibilizer selected from

TABLE 1

| No. | Tensile Strength (kg/mm2) | Elongation (%) | Tear Strength (kg/mm) | Print-ability | Adhesiveness |
|---|---|---|---|---|---|
| Ex. 1 | 2.6(MD), 3.3(TD) | 80(MD), 18(TD) | 0.9(MD), 1.0(TD) | Excellent | Good |
| Ex. 2 | 2.5(MD), 3.2(TD) | 70(MD), 15(TD) | 0.8(MD), 0.9(TD) | Excellent | Good |
| Ex. 3 | 2.0(MD), 2.6(TD) | 50(MD), 12(TD) | 0.9(MD), 1.1(TD) | Excellent | Excellent |
| Ex. 4 | 1.9(MD), 2.6(TD) | 40(MD), 12(TD) | 0.9(MD), 1.1(TD) | Excellent | Excellent |
| Ex. 5 | 2.9(MD), 3.4(TD) | 44(MD), 10(TD) | 0.7(MD), 0.7(TD) | Good | Excellent |
| C. Ex. 1 | 2.7(MD), 3.2(TD) | 80(MD), 20(TD) | 0.9(MD), 1.0(TD) | Poor | Poor |

Measurement of Properties

Tensile strength (kg/mm$^2$): measurement according to ASTM D882

Tensile elongation: measurement according to ASTM D882 the group consisting of EVA, methylmethacrylate-butadiene-styrene (MBS), maleic anhydride, and polypropylene-graft-maleic anhydride (PP-g-MA).

* * * * *